March 2, 1954
S. L. NORMAN
2,670,654
VISION TESTING SELECTOR SLIDE
Filed June 5, 1950
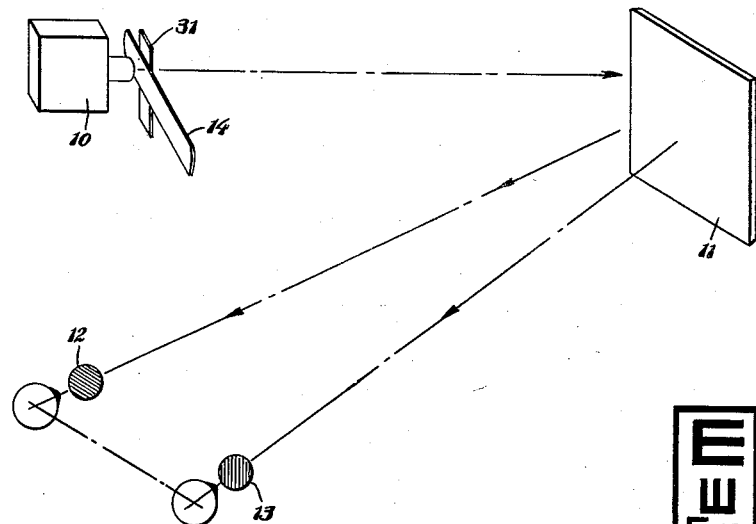
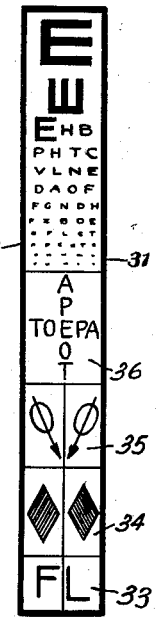
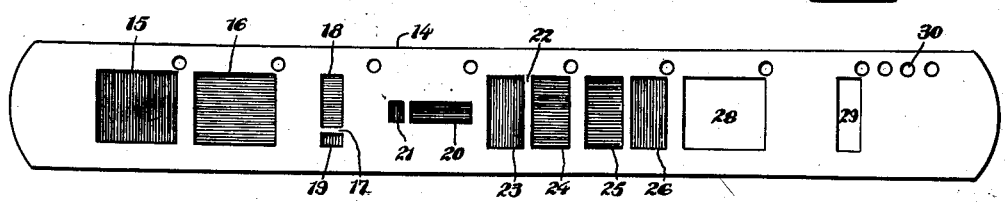
INVENTOR.
SIDNEY L. NORMAN,
BY: *H. R. Hahn.*
ATTORNEY.

Patented Mar. 2, 1954

2,670,654

UNITED STATES PATENT OFFICE 2,670,654

VISION TESTING SELECTOR SLIDE

Sidney L. Norman, Fort Lauderdale, Fla.

Application June 5, 1950, Serial No. 166,220

4 Claims. (Cl. 88—20)

The present invention relates to an apparatus for the binocular testing of vision, the binocular determination of heterophoria (eye muscular balance) and vision training to accomplish binocular stereoscopic vision.

The object of my invention is to provide an apparatus which makes possible the subjective determination of the visual acuity and the refractive error of each eye while both eyes are open and seeing simultaneously.

Another object of my invention is to determine the muscular balance of a pair of eyes under conditions of seeing binocularly and without disassociation.

Another object of my invention is to provide the means of determining the quality of fusion, depth perception and the stereoscopic faculty of a subject, and to provide means for training and conditioning faulty binocular achievement.

For the purpose of disclosing my invention I have illustrated an embodiment of the same in the accompanying drawings in which Fig. 1 is a perspective view more or less diagrammatic of apparatus embodying my invention.

Fig. 2 is an elevation of a selector slide embodying my invention.

Fig. 3 is an elevation of a transparent indicia slide.

In the use of my invention the selector slide illustrated in Fig. 2 and the indicia slide illustrated in Fig. 3 are conjointly used with a light projector 10 adapted to project light upon a screen 11. The light projector 10 may be a projector manufactured by the American Optical Company and known under the trade name as a "Projector Chart."

The screen 11 is positioned so that the light beam or beams from projector 10 may be projected thereon and may be of any suitable material having a silvered surface, or any surface such that it will not depolarize the light reflected from its surface.

The patient whose eyes are to be tested has arranged in front of his eyes by being supported in a phoropter polarized filters 12 and 13, the right filter 13 being set with its polarization vertical and the left filter 12 being set with its polarization horizontal.

Cooperating with the projector 10 is a selector slide 14 illustrated in Fig. 2 which may be in the form of a rectangular slide made of sheet metal having a plurality of openings or apertures formed therein. In the present instance there are eight such apertures.

The first opening or aperture is rectangular and supports therein a rectangular plano Polaroid sheet 15 having its polarization axis vertical. The second opening likewise is rectangular, being of the same dimensions as the first opening and supports therein a rectangular plano Polaroid sheet 16, the same as sheet 15 except that the polarization axis is in the horizontal position. The third opening is a rectangular opening with a dividing septum 17 resulting in a larger or longer opening supporting a plano Polaroid sheet 18 and a smaller sheet 19, the two Polaroid sheets constituting in effect a single aperture-stop. The length of the smaller sheet 19 is only approximately one-fifth of the sheet 18. The length of the combined sheets is equal to the length of the sheet 16 and is placed in the center of a rectangular area of the same dimensions as the area occupied by the sheets 15 and 16. The polarization axis of the sheet 18 is horizontal while the polarization axis of the sheet 19 is vertical.

The fourth opening is an elongated rectangular opening divided in the same manner as the third opening with the axis however, at a right angle to the axis of sheets 18 and 19 and supporting a sheet 20 having its polarization axis horizontal and a smaller sheet 21 having its polarization axis vertical. These two sheets constitute in effect a single aperture-stop.

Adjacent the fourth opening is a pair of vertical rectangular openings separated by a septum 22, one side of said opening, the one to the left supporting a sheet 23 having its polarization axis vertical, and the other opening supports a sheet 24 having its polarization axis horizontal, these two sheets constituting in effect a single aperture-stop. Adjacent the sheets 23 and 24 are a second pair of sheets 25 and 26 similar to sheets 23 and 24 except that their polarization axes are reversed.

Adjacent the sheets 25 and 26 is a rectangular opening 28 which supports no sheet and is similar in shape and size to the sheet 16. At the extreme right of the slide there is another opening 29 which supports no sheet. These openings are provided for the convenience of the examiner should he desire to depart from the technique heretofore described or desire to check the technique against another. The slide is provided with suitable cup like sockets 30 which are adapted to cooperate with spring pressed balls in the "Projector Chart" for accurately positioning the slide openings relatively to the right beam.

Cooperating with the light projector 10 and the selector slide shown in Fig. 2 is a transparent indicia slide designated in its entirety at 31 which comprises a strip of transparent material which may be of any of the commercial types of plastic film. This projector slide has printed thereon, for tests made through the aperture of the selector slide, suitable indicia. On the upper half of the projector slide are printed more or less standard figures 32 now used for test purposes including letters of the alphabet gradually diminishing in size. This indicia 32 occupies about the upper half of the projector slide.

The lower half of the projector slide is divided into four areas. The bottom 33 has arranged the letters F and L one on each side of the vertical dividing line. The next area 34 is provided with a pair of diamond shaped figures one on each side of the center line, the figures being provided with diverging finely divided lines. The area 35 above is provided with a pair of ovals diagonally disposed one on each side of the center line and extending through the ovals downwardly and inwardly inclined is a pair of arrows. The top section 36 has the letters APEOT arranged in vertical and horizontal positions, the E being common to both the vertical and horizontally disposed letters.

In the use of the apparatus the Polaroid filters are placed in position in front of the patient's eyes being preferably supported in a phoropter. The selector slide is positioned with sheet 15 before the light source and the indicia slide is disposed in front of the selector slide being moved to different vertical positions to project the different figures and letters 32 in the upper half of the slide on to the chart. Due to the fact that the axis of polarization of the light source is vertical in passing through sheet 15 in the selector slide and the axis of polarization of the filter 12 in the phoropter is horizontal, the projected image on screen 11 will be invisible to the left eye. However, the right eye, positioned behind filter 13, the polarization axis of which is vertical will be able to see the projected characters on the screen 11. Thus the right eye can be tested for visual acuity while the left eye is still participating in the binocular function of seeing, because it can see the screen, the wall of the room or any other object in its field of view.

The same testing process may be used with the left eye by shifting the selector slide to interpose sheet 16 between the light source and the projector slide. Under these circumstances the visuality of the eyes will be just reversed.

In using sheets 18 and 19 the projector slide is moved to project the lettered images of the letters APEOT shown at 36 such that the lower letter T will be projected through sheet 19 and the APEO projected through sheet 18.

Under these circumstances, the projected letter T will be polarized vertical and will be visible only to the right eye. The letters APEO will be polarized horizontal and will be visible only to the left eye.

Under these circumstances, if the patient sees the letter T in exact vertical alignment with the letters APEO, then orthophoria is indicated. If the letter T is displaced to the right of the letters APEO then esophoria is indicated. If the letter T is displaced to the left of the letters APEO then exophoria is indicated.

To measure the vertical balance, move the selector slide so that the letter T is projected through sheet 21 and the letters APEO projected through sheet 20.

Under these circumstances the right eye sees the letter T and the left eye sees the letters APEO. If all the letters are seen in horizontal alignment then no vertical imbalance is indicated. If the letter T is seen higher than the letter APEO then left hyperphoria is indicated.

If the letter T is seen lower than the letters APEO then right hyperphoria is indicated.

Similarly to measure vertical balance sheets 20 and 21 are positioned in front of the light source.

Sheets 23 and 24 may be used for testing stereopsis and depth perception by using them in conjunction with the sets of figures in the lower three areas 33, 34 or 35 of the projector slide. Sheets 25 and 26 are the same as sheets 23 and 24 except that the polarization axes of the sheets are reversed and by alternately shifting from one set of sheets to the other stereoptical and visual training may be effected.

As clearly illustrated in the drawings, a single screen 11 has been employed and a single source of light from the projector 10. The selector slide 14 is adjustably shifted across the light beam from the projector in a horizontal path for positioning any of the apertures over the light opening, while the indicia slide 31 is shifted across the light beam in a vertical plane or upon an angle of ninety degrees from the selector slide and in slightly spaced relation. Thus, a selected indicia of indicia slide may be quickly and accurately projected upon the screen and the desired aperture with its polarized sheet shifted to a position overlying the selected indicia. In this manner, the selected indicia is projected upon the screen accurately spaced upon opposite sides of the center line of the indicia slide. In order to accurately measure the phoria, and the degree of stereopsis, and to institute remedial training for weak and inadequate fusion and stereopsis, the doubled images which are projected on the screen must have a definitely fixed relationship. The space interval must be a controlled interval. It is for this reason that the single projector is an important factor, because it provides the controlled conditions necessary for accuracy in measurement. With the selected indicia projected upon the screen, polarization thereof is quickly and easily controlled and changed by shifting the selector slide from one polarized aperture to another.

Summarizing the functional properties of the device, it should be pointed out, that apertures 15 and 16 accomplish the same purpose for the right and left eye respectively; namely, it permits under the conditions of binocular fixation, the determination of the uncorrected visual acuity of each eye, the application of the corrective lens for each eye and the determination of each eye's corrected visual acuity. Other tests which are available through these two apertures are: 1, Suppression or inhibition of vision in one eye, and 2, malingering tests.

Apertures 18 and 19 permit the measurement of the horizontal phoria or muscle balance under binocular conditions.

Apertures 21 and 20 permit the measurement of the vertical muscular balance or phoria under binocular conditions.

Apertures 23 and 24 permit the investigation of both the qualitative and quantitative measure of the patient's fusion and stereoscopic faculties. Essentially, these apertures permit the projector to function as a dual projector in that a pair of images are projected on the screen. The arrangement of the polarizing filters in these apertures, in conjunction with the polarizing filters before the eyes, permits each eye to see only one of the two projected images. The separation of the doubly projected images are controlled by arrangement of the indicia on the indicia slide, so that use of a single projector in dual projection is most necessary for the control of the separation of the images. Vision training and the further development of the fusion and stereoscopic faculty of a patient may be accomplished through the proper manipulation of suitable indicia on the indicia slide. It will therefore be apparent, that each aperture has its own particular function in providing the means for the accomplishment of a specific test. The factors which make the specific test possible are:

1. The geometrical design or shape of the aperture.
2. The position of the polarization axis in the aperture relative to the position of the polarization axis of the polarizing filters in front of the eyes.
3. The arrangement of the indicia on the indicia slide.

The sequence of each aperture is such as to permit a sequence of specific tests which lead to complete analysis and diagnosis of a vision anomaly. This sequence of tests differ from those tests now in use, in that each and every test is made under binocular conditions; namely, binocular visual fixation, and the application of corrective measures are binocularly applied.

I claim as my invention:

1. Test target apparatus for testing binocular vision and adapted for use in conjunction with binocular polarizing viewers, said apparatus comprising, a transparent slide having a series of successive frames, each frame carrying a target means therein, each target means comprising a portion for left eye viewing and a portion for right eye viewing, a selector slide, said selector slide having a series of successive frames, at least two spaced apart polarizing areas carried by each of said selector slide frames, each selector slide frame being designed to coact with a particular target frame, one of said polarizing areas corresponding to the right eye portion of its coacting target frame and another of said polarizing areas corresponding to the left eye portion of its coacting target frame, said polarizing areas being polarized on axes at right angles to each other, whereby the right eye portion of the target is restricted to vision by the right eye while the left eye portion can be seen only by the left eye, and the said slides being relatively shiftable whereby to selectively position coacting frames in visual alignment, each combination of coacting frames serving to perform a different type optical test.

2. Test target apparatus for testing binocular vision and adapted for use in conjunction with binocular polarizing viewers, said apparatus comprising, a transparent slide having a series of successive frames, each frame carrying a target means therein, each target means comprising a portion for left eye viewing and a portion for right eye viewing, a selector slide, said selector slide having a series of successive frames, at least two polarizing areas carried by each of said selector slide frames, each selector slide frame being designed to coact with a particular target frame, one of said polarizing areas corresponding to the right eye portion of its coacting target frame and another of said polarizing areas corresponding to the left eye portion of its coacting target frame, a septum included in each of said selector slide frames for spacing said polarizing areas, said polarizing areas being polarized on axes at right angles to each other, whereby the right eye portion of the target is restricted to vision by the right eye while the left eye portion can be seen only by the left eye, and the said slides being relatively shiftable whereby to selectively position coacting frames in visual alignment, each combination of coacting frames serving to perform a different type optical test.

3. Test target apparatus for testing binocular vision and adapted for use in conjunction with binocular polarizing viewers, said apparatus comprising, a transparent slide having a series of successive frames, each frame carrying a target means therein, each target means comprising a portion for left eye viewing and a portion for right eye viewing, a selector slide, said selector slide having a series of successive frames, at least two polarizing areas carried by each of said selector slide frames, each selector slide frame being designed to coact with a particular target frame, one of said polarizing areas corresponding to the right eye portion of its coacting target frame and another of said polarizing areas corresponding to the left eye portion of its coacting target frame, said polarizing areas being polarized on axes at right angles to each other, whereby the right eye portion of the target is restricted to vision by the right eye while the left eye portion can be seen only by the left eye, the said slides being relatively shiftable whereby to selectively position coacting frames in visual alignment, each combination of coacting frames serving to perform a different type of optical test and one of said selector slide frames and its coacting target frame each having relatively small and relatively large coacting polarizing areas and target portions, respectively, for phoria tests.

4. Test target apparatus for testing binocular vision and adapted for use in conjunction with binocular polarizing viewers, said apparatus comprising, a transparent slide having a series of successive frames, each frame carrying a target means therein, each target means comprising a portion for left eye viewing and a portion for right eye viewing, a selector slide, said selector slide having a series of successive frames, at least two polarizing areas carried by each of said selector slide frames, each selector slide frame being designed to coact with a particular target frame, one of said polarizing areas corresponding to the right portion of its coacting target frame and the other of said polarizing areas corresponding to the left eye portion of its coacting target frame, said polarizing areas being polarized on axes at right angles to each other, whereby the right eye portion of the target is restricted to vision by the right eye while the left eye portion can be seen only by the left eye, the said slides being relatively shiftable whereby to selectively position coacting frames in visual alignment, each combination of coacting frames serving to perform a different type of optical test and one of said selector slide frames and its coacting target frame each having relatively short and relatively long coacting polarizing areas and target portions, respectively, for phoria tests.

SIDNEY L. NORMAN.

References Cited in the file of this patent

UNITED STATES PATENTS

| Number | Name | Date |
|---|---|---|
| 1,949,067 | Wheelook et al. | Feb. 27, 1934 |
| 2,206,303 | Neumueller et al. | July 2, 1940 |
| 2,238,207 | Ames et al. | Apr. 15, 1941 |
| 2,280,297 | Neumueller et al. | Apr. 21, 1942 |
| 2,294,382 | Burian | Sept. 1, 1942 |
| 2,415,550 | Yarosh | Feb. 11, 1947 |
| 2,565,185 | Pastor | Aug. 21, 1951 |